United States Patent [19]

Allen et al.

[11] 3,840,813

[45] Oct. 8, 1974

[54] DYNAMIC RMS CONVERTER

[75] Inventors: David W. Allen, Beaverton; Hideki Iwata, Portland, both of Oreg.

[73] Assignee: Tektronix, Inc., Beaverton, Oreg.

[22] Filed: Feb. 13, 1973

[21] Appl. No.: 331,757

[52] U.S. Cl.............. 328/26, 235/193.5, 307/261, 324/132, 328/144
[51] Int. Cl............................................ G01r 19/02
[58] Field of Search ..... 235/183, 193.5, 195, 151.3; 324/132; 328/144, 26; 307/261

[56] References Cited
UNITED STATES PATENTS

| | | | |
|---|---|---|---|
| 3,281,689 | 10/1966 | Schneider et al.................. | 324/132 |
| 3,422,258 | 1/1969 | Charter et al..................... | 235/193.5 |
| 3,705,297 | 12/1972 | John .................................. | 235/193 |
| 3,714,570 | 1/1973 | Howell.............................. | 324/132 |

FOREIGN PATENTS OR APPLICATIONS

| | | | |
|---|---|---|---|
| 194,183 | 3/1967 | U.S.S.R............................. | 328/132 |

*Primary Examiner*—Felix D. Gruber
*Attorney, Agent, or Firm*—Adrian J. LaRue

[57] ABSTRACT

A signal measuring means to provide a DC voltage that is proportional to the root-mean square (RMS) value of the input signal.

12 Claims, 2 Drawing Figures

PATENTED OCT 8 1974        3,840,813

DYNAMIC RMS CONVERTER

BACKGROUND OF THE INVENTION

This invention relates to a signal measuring means wherein an input signal of simple or complex nature applied to the signal measuring means will provide a DC output voltage that is proportional to the true RMS value of the input signal.

In many prior-art circuits, means to measure an equivalent heating effect are known. These means are limited in that they are sensitive to the input signal distortion and the input frequency range. In addition, the output indicating device is usually calibrated for each individual input. RMS determination means of the prior art include iron-vane, electrostatic, or thermocouple circuits; the latter overcoming some of the former limitations. The thermocouple, however, is limited by relatively slow response.

Still further prior art means for measuring the RMS value of an input signal contain a plurality of components (i.e., diodes, resistors, and capacitors). Such circuits operate on an approximation and are limited by the quality of the components.

BRIEF SUMMARY OF THE INVENTION

The signal measuring means according to the present invention eliminates the problems generally associated with the prior art by providing shorter settling time, high accuracy, wide environmental temperature range, simplicity of circuits, etc. The present invention provides an output DC voltage which is proportional to the RMS value of the input signal.

In the preferred embodiment, input signals to be measured are applied to a rectifier circuit which determines the input signal magnitude and polarity. The output of the rectifier stage is applied to a gain cell stage which is fully described in U.S. Pat. No. 3,689,752. The output of the gain cell stage is applied to an averaging filter stage with feedback to produce the output DC voltage proportional to the RMS value of the input signal.

It is therefore one object of the present invention to provide an improved RMS measuring means capable of measuring over a wide frequency domain.

It is another object of the present invention to provide an improved RMS measuring means of simpler design.

It is still another object of the present invention to provide an improved RMS measuring means whereby the output indicating devices need not be calibrated for different input signals.

It is yet another object of the present invention to provide an improved RMS measuring means having high accuracy.

It is a still further object of the present invention to provide an improved RMS measuring means having reduced response time.

It is an additional object of the present invention to provide an RMS measuring means to provide a DC output voltage that is proportional to the root-mean-square value of the input signal.

The subject matter of the present invention is particularly pointed out and distinctly claimed in the following description. The invention, however, both to organization and method of operation together with further advantages and objects thereof may best be understood by reference to the following description taken in connection with the accompanying drawings wherein like reference characters refer to like elements.

DETAILED DESCRIPTION OF PREFERRED EMBODIMENT

Figure 1:
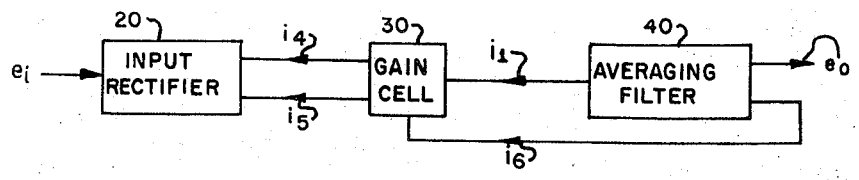
FIG. 1 is a block diagram of the preferred embodiment for determining the output DC voltage that is proportional to the RMS value of the input signal.

A block diagram used in the RMS converter means is shown in FIG. 1. The system consists of three basic blocks comprising an input rectifier 20, a gain cell 30, and an averaging filter 40 wherein an input signal to be measured is applied to the rectifier and the output from the averaging filter is a DC voltage that is proportional to the true RMS value of the input signal.

Basically, the input signal $e_i$ applied to input rectifier 20 produces two identical currents $i_4$ and $i_5$. Currents $i_4$ and $i_5$ are directly proportional to the absolute magnitude of the input signal $e_i$. (An alternative to the input signal $e_i$ could well be a current through an external resistance as well known by those skilled in the art.). Currents $i_4$ and $i_5$ are applied to the gain cell 30.

Gain cell 30 takes currents $i_4$ and $i_5$ as inputs and provides an output current $i_1$ which is directly proportional to the product of currents $i_4$ and $i_5$ divided by feedback current $i_6$. Operation of gain cell 30 is shown and fully described in U.S. Pat. No. 3,689,752.

Averaging filter 40 takes current $i_1$ as an input and provides two outputs; output DC voltage $e_o$ directly proportional to the average value of current $i_1$, and feedback current $i_6$ directly proportional to output voltage $e_o$.

The combination of input rectifier 20, gain cell 30, and averaging filter 40 connected as shown in FIG. 1 will therefore provide an output DC voltage $e_o$ which is proportional to the RMS value of the input signal $e_i$.

Figure 2:
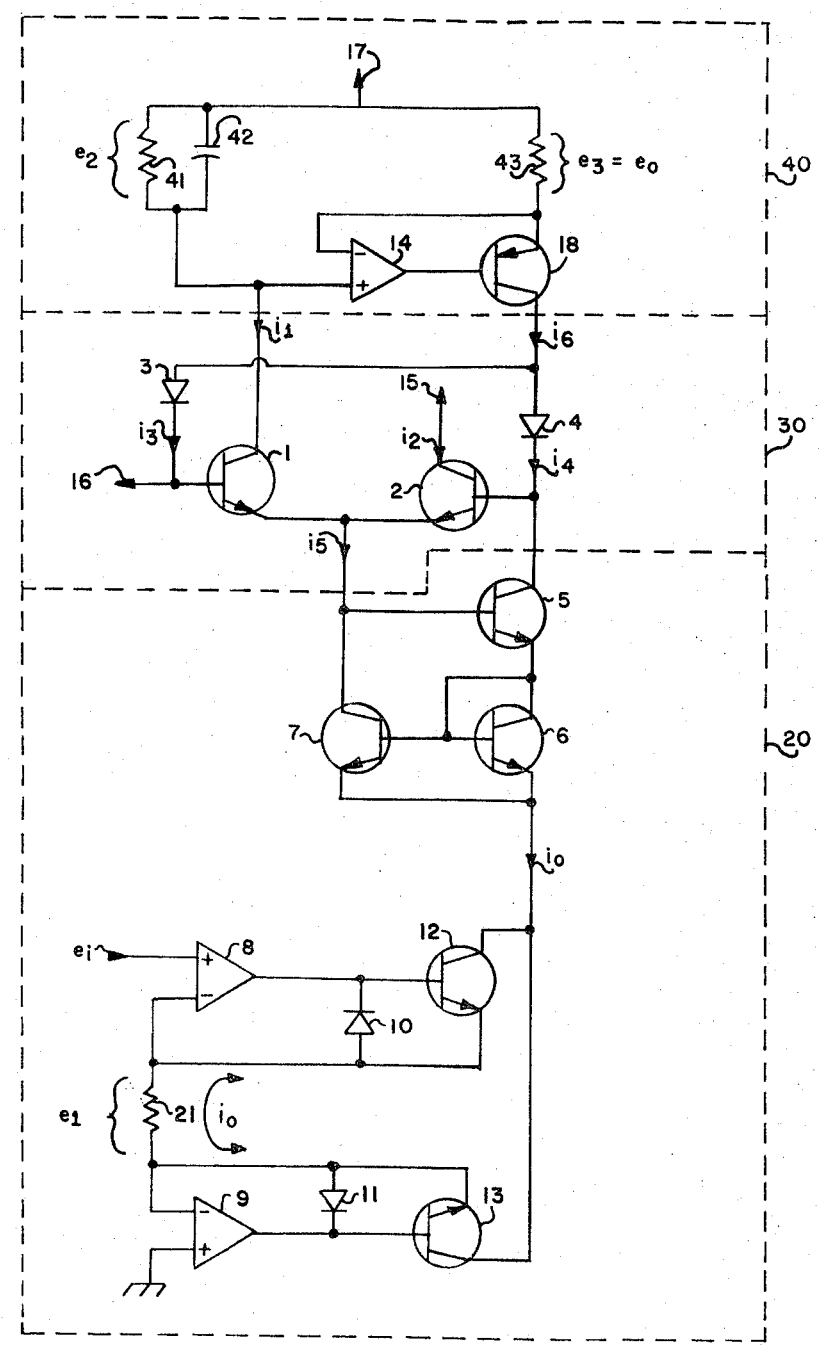
FIG. 2 is a schematic diagram of the preferred embodiment according to the present invention.

Shown in FIG. 2 is a schematic diagram of the preferred embodiment shown in FIG. 1.

The input signal $e_i$ is applied to an input rectifier circuit 20 wherein operational amplifiers 8 and 9 ($e_i$ connected to the non-inverting (+) input of operational amplifier 8) have outputs which are connected to base electrodes of transistors 12 and 13 respectively. Diodes 10 and 11 are disposed between the base electrode and emitter electrode of transistors 12 and 13 respectively such that the anodes of diodes 10 and 11 are connected to the emitter electrodes of transistors 12 and 13 respectively. A resistor 21 is disposed between the anodes of diodes 10 and 11 and the emitter electrodes of transistors 12 and 13 respectively. Resistor 21 has one end also connected to the inverting (−) input of operational amplifier 8 and the other end also connected to an inverting (−) input of operational amplifier 9 whose non-inverting (+) input is connected to signal ground. The collector electrodes of transistors 12 and 13 are connected together and connected in common to the emitter electrodes of transistors 6 and 7. Transistors 6 and 7 have their base electrodes connected together and connected in common with the collector electrode of transistor 6. The emitter and base electrodes of transistor 5 are connected to the collector electrode of transistor 6 and to the collector electrode of transistor 7 respectively. The common connection of the base electrode of transistor 5 and the collector electrode of transistor 7 is connected to a common junction between the emitter electrodes of transistors 1 and 2. The collector electrode of transistor 5 is connected to the base electrode of transistor 2. As shown in FIG. 2, the above connections complete the input rectifier 20 block of the converter system.

Operation of the rectifier is as follows: On positive excursion of input signal $e_i$, transistor 12 is biased into conduction, transistor 13 is biased off. Due to balance action of operational amplifiers 8 and 9, resistor 21 has therefore a difference of potential $e_i$. Therefore, current $i_o$ is developed and flows via transistor 12 to signal ground via operational amplifier 9. On negative excursions of input signal $e_i$, transistor 13 is biased on, transistor 12 biased off. Again, voltage $e_i$ produces current $i_o$ except in the opposite direction. Hence current $i_o$ is directly proportional to the magnitude of input signal $e_i$ regardless of direction. Current $i_o$ is then applied to a halving circuit well known by those skilled in the art. From the foregoing and using standard feedback analysis techniques, $$i_4 = i_5 = K_1 |e|$$

(1).

As previously stated, the base electrode of transistor 5 and the collector electrode of transistor 7 are connected together and are connected to gain cell 30 via a common connection between the emitter electrodes of transistors 1 and 2. The base electrode of transistor 1 is connected to a suitable source of bias current 16. Also, connected to the base electrode of transistor 1 is the cathode of a diode 3 whose anode is connected to the anode of second diode 4. Diode 4 has its cathode connected in common to the base electrode of transistor 2 and the collector electrode of transistor 5. The collector electrode of transistors 1 and 2 are connected to the averaging filter 40 and a suitable source of potential 15 respectively.

It should be noted that transistors 1 and 2, 6 and 7, and diodes 3 and 4 are matched pairs and as previously stated, gain cell 30 has been shown and fully described in U.S. Pat. No. 3,689,752. Gain cell 30 therefore produces current $i_1$ such that (from equation 1)

$$i_1 = i_4 \, i_5/i_6 \, K_2 = K_1^2 K_2 \, |e_i^2|/i_6$$

(2).

Proceeding, and as previously stated, the collector electrode of transistor 1 is connected to averaging filter 40 wherein the connection is the non-inverting (+) input of an operational amplifier 14 whose output is directly connected to the base electrode of a transistor 18. Transistor 18 has its collector electrode connected to the common connection of the anodes of diodes 3 and 4. Disposed between a suitable source of potential 17 and the non-inverting (+) input of operational amplifier 14 is a resistor 41 and a capacitor 42 connected in parallel. A second resistor 43 is disposed between the source of potential 17 and the emitter electrode of transistor 18 across which the desired output DC voltage $e_o$ is obtained. The inverting input of operation 14 is connected in common to the emitter electrode of transistor 18 and the resistor 43.

Averaging filter 40 takes current $i_1$ as an input, thus producing voltage $e_2$ across resistor 41. This voltage is then averaged by capacitor 42. Due to balance action of operational amplifier 14, the voltage $e_3$ across resistor 43 equals voltage $e_2$ across resistor 41 hence feedback current $i_6$ is produced. Therefore (from equations 1 and 2)

$$e_o = K_3 \, i_1 = K_1^2 K_2 \, K_3 \, |\overline{e_i^2}|/i_6$$

(3), and $$i_6 = K_4 \, e_o$$

(4).

Combining equation (3) with equation (4), $$e_o = K_1^2 K_2 \, K_3 \, |\overline{e_i^2}|/K_4 \, e_o$$

(5).

Solving equation (5) for $e_o$, $$e_o = K_5 \sqrt{\overline{e_i^2}}$$

(6), where $$K_5 = \sqrt{K_1 \, K_2 \, K_3/K_4}$$

(7), and is a constant of proportionately which depends on circuit components.

Equation (6) is by definition the RMS value. Hence, the output DC voltage $e_o$ is proportional to the RMS value of the input signal $e_i$.

While there has been shown and described the preferred embodiments of the present invention, it will be apparent to those skilled in the art that many changes and modifications may be made without departing therefrom in its broader aspects. Therefore, the appended claims are intended to cover all such changes and modifications as fall within the true spirit and scope of this invention.

We claim:

1. A signal measuring device which provides an output direct current voltage which is proportional to the root-mean-square (RMS) value of an alternating input signal applied to the device, comprising:

an input terminal for receiving the alternating input signal; rectifier means including halving means, the rectifier means having input means connected to receive the alternating input signal and providing to input means of said halving means a first current proportional to the magnitude of the alternating input signal traversing in a first direction or a second current proportional to the magnitude of the alternating input signal traversing in a second direction, said halving means having at least two output means and providing at one of said at least two output means a third current whose absolute magnitude is half of said first or second current magnitude and providing at the other of said at least two output means a fourth current whose absolute magnitude is half of said first or second currents, the said third and fourth currents having equal absolute magnitudes;

function means having input means, control means and output means, the input means connected to receive the third and fourth currents and the function means providing at its output a fifth current which is the product of the third current, the fourth current and the inverse of an additional current received by the control means; and averaging filter means having input means and output means, the input means connected to receive said fifth current and the averaging filter means providing at its output said additional current, the additional current flowing through a resistance means to provide the direct current voltage proportional to the root-mean-square value of the alternating input signal applied to the device.

2. The device according to claim 1 wherein said rectifier means further comprises:
   a first amplifier having at least two inputs, one of which is connected to said input terminal and an output;
   a second amplifier having at least two inputs, one of which is connected to a reference voltage, and an output;
   impedance means disposed between the opposite input of said first amplifier and the opposite input of said second amplifier;
   a first variable impedance means connected to the output of said first amplifier; and
   a second variable impedance means connected to the output of said second amplifier.

3. The rectifier means according to claim 2 wherein said first and second amplifiers define operational amplifiers whose opposite inputs are inverting inputs.

4. The rectifier means according to claim 2 wherein said impedance means defines a resistance having a resistance substantially greater than a resistance wire.

5. The rectifier means according to claim 2 wherein said first and second variable impedance means defines a bipolar transistor of the same conductivity type.

6. The device according to claim 1 wherein said halving means defines a differential amplifier.

7. The device according to claim 1 wherein said function means defines a four quadrant multiplier means.

8. The function means according to claim 7 wherein said four quadrant multiplier means defines a gain cell.

9. The device according to claim 1, said averaging filter means further comprising:
   a source of reference voltage;
   an amplifier having at least two inputs, one of which is inverting, and an output;
   first impedance means disposed between said source of reference potential and the non inverting input of said amplifier;
   second impedance means disposed between said inverting input and said source of reference potential; and
   variable impedance means disposed between said inverting input and said output.

10. The averaging filter according to claim 9 wherein said first impedance means defines a complex impedance.

11. The averaging filter according to claim 9 wherein said second impedance means defines a resistor across which the RMS value is developed.

12. The averaging filter according to claim 9 wherein said variable impedance means defines a bipolar transistor.

* * * * *